United States Patent
Arold

[11] Patent Number: 5,611,728
[45] Date of Patent: Mar. 18, 1997

[54] DUST FILTER WHICH IS SURROUNDED BY A FRAME

[75] Inventor: Klaus Arold, Sindelfingen, Germany

[73] Assignee: Mercedes-Benz AG, Stuttgart, Germany

[21] Appl. No.: 502,869

[22] Filed: Jul. 14, 1995

[30] Foreign Application Priority Data

Jul. 14, 1994 [DE] Germany .................. 44 24 793.1

[51] Int. Cl.⁶ .................................................. B60H 3/06
[52] U.S. Cl. ................ 454/158; 55/486; 55/493; 55/501
[58] Field of Search ................ 454/158; 55/385.3, 55/482, 486, 493, 501, 507

[56] References Cited

U.S. PATENT DOCUMENTS

| | | | |
|---|---|---|---|
| 2,779,431 | 1/1957 | McMullen et al. | 55/486 X |
| 2,981,367 | 4/1961 | Sprouse | 55/501 X |
| 3,076,303 | 2/1963 | Durgeloh | 55/501 X |
| 4,561,868 | 12/1985 | Von Eis et al. | 55/501 X |
| 4,784,048 | 11/1988 | Nelson | 454/158 |
| 4,838,910 | 6/1989 | Stollenwerk et al. | 55/493 X |

FOREIGN PATENT DOCUMENTS

| | | | |
|---|---|---|---|
| 3837968 | 5/1990 | Germany . | |
| 302527 | 1/1955 | Switzerland | 55/501 |

Primary Examiner—Harold Joyce
Attorney, Agent, or Firm—Evenson McKeown Edwards & Lenahan, PLLC

[57] ABSTRACT

A dust filter is surrounded by a frame and is held exchangeably in an air duct of a heating system or air-conditioning system of a motor vehicle and downstream of which an absorption filter may be arranged. For fitting an exchange of the absorption filter, the frame has an integrally formed edge or extension on the air-outlet side of the dust filter, which extension has latching openings into which hooks protruding resiliently from a retaining frame of an absorption filter are latched.

11 Claims, 1 Drawing Sheet

5,611,728

DUST FILTER WHICH IS SURROUNDED BY A FRAME

BACKGROUND AND SUMMARY OF THE INVENTION

The invention relates to a dust filter which is surrounded by a frame, is held exchangeably in a shaft in an air duct of a heating system or air-conditioning system of a motor vehicle and downstream of which an absorption filter may be arranged.

A filter insert of this type is known from German Patent Document 38 37 968 A1 and fills the entire holding shaft, with the result that, if the motor vehicle is only equipped with a dust filter, this filter insert can migrate axially.

It is an object of the invention to configure a frame which holds a dust filter in such a manner that said frame provides a simple retrofitting means for an exchangeable absorption filter, it being intended, at the same time, to prevent axial migration of the frame when an absorption filter is not being held.

This object is achieved according to preferred embodiments of the invention by providing a filter arrangement which can be exchangeably inserted in a motor vehicle heating or air conditioning system air duct, comprising:

a dust filter assembly composed of a dust filter housed in a dust filter frame, said dust filter frame having an integrally formed frame end section which protrudes beyond the dust filter at an air outlet end of the dust filter, wherein said frame end section has latching openings for accommodating latching hooks of an absorption filter which can be optionally arranged downstream of the dust filter.

The absorption filter is effectively prevented from bulging, even at high air speeds, if the retaining frame is provided with a grating which is pre-curved resiliently in the direction of the absorption filter to be held, according to especially preferred embodiments of the invention.

The absorption filter is securely held, by gripping along its edge, if the dust filter frame has, on its edge side, an encircling clamping slope as a bearing surface for the absorption filter, according to especially preferred embodiments of the invention.

The gripping action is further increased so that even absorption filters which are in the form of a mat and have a non-rigid construction are retained securely if the frame and the retaining frame have a clamping slope and if this creates an encircling, dovetailed clamping groove for holding the absorption filter, according to especially preferred embodiments of the invention.

Other objects, advantages and novel features of the present invention will become apparent from the following detailed description of the invention when considered in conjunction with the accompanying drawings.

DETAILED DESCRIPTION OF THE INVENTION

Figure 1:
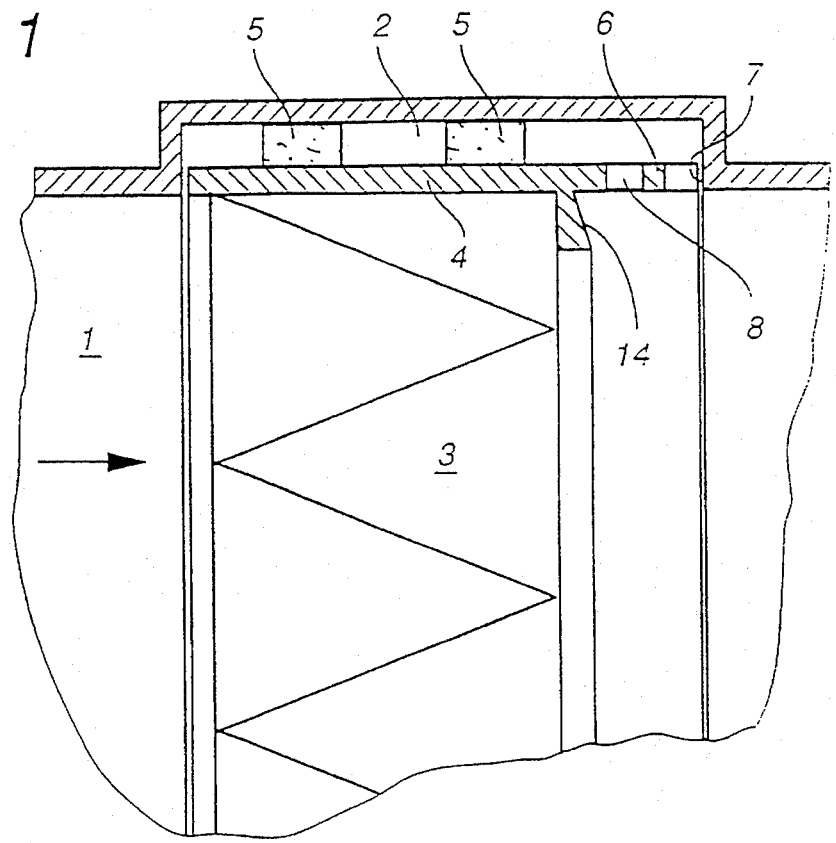
FIG. 1 is a schematic section view showing a dust filter frame which is held by a shaft and is only fitted with a dust filter, constructed according to a preferred embodiment of the invention.
Figure 2:
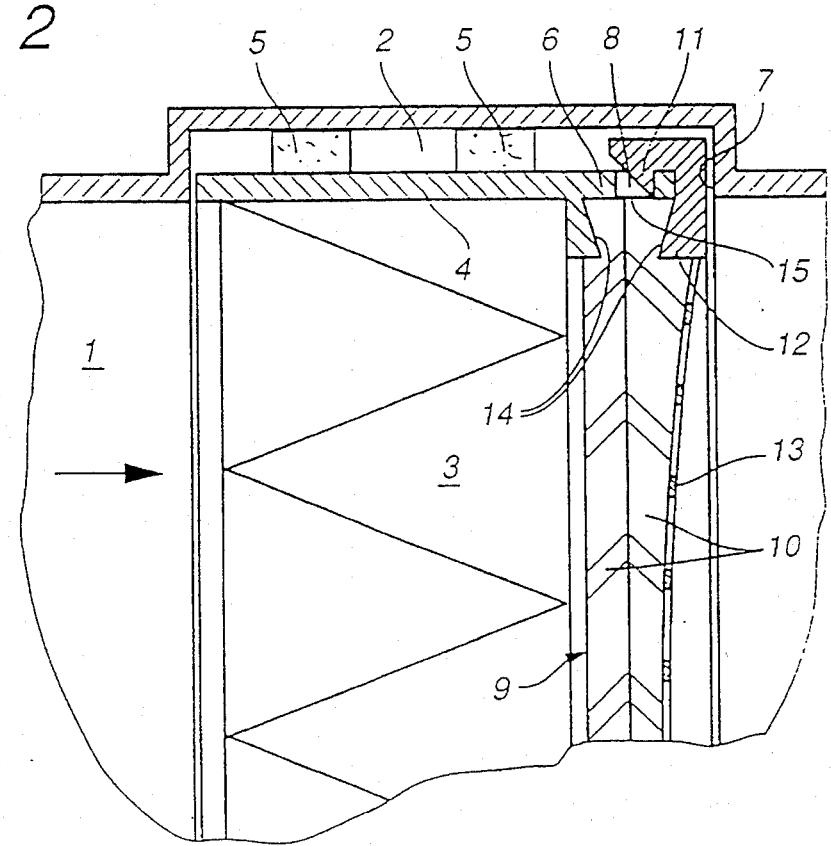
FIG. 2 shows the illustration according to FIG. 1 with an absorption filter added.

An air duct 1 of a heating system or air-conditioning system (not shown) of a motor vehicle widens locally to form a shaft 2 which serves as the holding place for a frame 4 connected fixedly to a dust filter 3. The frame 4 is sealed off from the shaft 2 by means of seals 5, and after a cover, which is not shown, is opened, the frame 4 together with the dust filter 3 can be exchanged when the dust filter is worn out. On the air-outlet side of the dust filter 3 a frame edge or extension is joined onto the frame 4 so that the frame 4 lies in the shaft 2 with only slight axial play, which extension 6 ends as shown in FIG. 1 shortly before the associated wall 7 of the shaft 2.

Let into the edge 6 are a plurality of latching openings 8, only one of which can be seen, into which resiliently movable latching hooks 11 protruding from a retaining frame 12 of an absorption filter are engaged when inserting an absorption filter 9. Absorption filter 9 is composed of two mats 10 arranged one behind the other and coated with activated carbon. Formed integrally on the retaining frame 12 is a grating 13 which is pre-curved resiliently in the direction of the absorption filter 9 and in this manner supports the absorption filter 9 so that even at high air speeds and the pressure difference associated therewith, bulging of the mats 10 and consequent sliding out of the edge-side grip does not happen. This point of grip is created by virtue of the fact that the dust filter frame 4 and the retaining frame 12 for the absorption filter assembly have respective slopes 14, which produces an encircling, dovetailed clamping groove 15.

In certain preferred embodiments, the frame 4 is rectangular or square and one latching opening 8 is disposed centrally of each side of the frame 4. Embodiments are contemplated with two latching openings per side.

To change the filter or filters, the frame 4 with the optionally attached absorption filter 9 is taken out of the shaft 2, the retaining frame 12 and the absorption filter 9 are removed and the two last-mentioned parts are attached to a new frame 4, which contains the dust filter 3, since experience has shown that the absorption filter 9 is not worn out until the dust filter 3 has been exchanged several times. If only the absorption filter 9 is to be exchanged, after the frame 4 has been taken out, the retaining frame 12 and the absorption filter 9 are removed, and by clipping to the retaining frame 12 a new absorption filter 9 is again connected to the frame 4. After the frame 4 has been inserted into the shaft 2 the filter arrangement is again ready for use.

Although the invention has been described and illustrated in detail, it is to be clearly understood that the same is by way of illustration and example, and iS not to be taken by way of limitation. The spirit and scope of the present invention are to be limited only by the terms of the appended claims.

What is claimed is:

1. A filter arrangement which can be exchangeably inserted in a motor vehicle heating or air-conditioning system air duct, comprising:

a dust filter assembly composed of a dust filter housed in a dust filter frame, said dust filter frame having an integrally formed frame end section which protrudes beyond the dust filter at an air outlet end of the dust filter, an absorption filter assembly composed of an absorption filter, composed of at least one mat supported in a retaining frame, wherein said frame end section has latching openings, and wherein said retaining frame has latching hooks resiliently engageable in the latching openings to hold the absorption filter assembly in position with respect to the dust filter assembly.

2. A filter arrangement according to claim 1, wherein the frame is disposed upstream of the retaining frame in an air flow direction through the filter arrangement end section of the dust filter frame when in an assembled in-use position.

3. A filter arrangement according to claim 1, wherein the retaining frame is provided with a grating which is pre-curved resiliently in the direction of the absorption filter supported in the retaining frame.

4. A filter arrangement according to claim 2, wherein the retaining frame is provided with a grating which is pre-curved resiliently in the direction of the absorption filter supported in the retaining frame.

5. A filter arrangement according to claim 1, wherein the dust filter frame has an encircling clamping slope on its edge side which serves as a bearing surface for the absorption filter.

6. A filter arrangement according to claim 2, wherein the dust filter frame has an encircling clamping slope on its edge side which serves as a bearing surface for the absorption filter.

7. A filter arrangement according to claim 3, wherein the dust filter frame has an encircling clamping slope on its edge side which serves as a bearing surface for the absorption filter.

8. A filter arrangement according to claim 4, wherein the dust filter frame has an encircling clamping slope on its edge side which serves as a bearing surface for the absorption filter.

9. A filter arrangement according to claim 1, wherein the dust filter frame and the retaining frame have respective clamping slopes, and wherein said clamping slopes create an encircling, dovetailed clamping groove for holding the absorption filter.

10. A filter arrangement according to claim 8, wherein the dust filter frame and the retaining frame have respective clamping slopes, and wherein said clamping slopes create an encircling, dovetailed clamping groove for holding the absorption filter.

11. A filter support arrangement accommodating exchangeable dust filters and absorption filters in motor vehicle heating or air conditioning system air ducts, comprising:

a dust filter frame having an integrally formed frame end section which protrudes beyond an air outlet end of a dust filter held in the dust filter frame when in an in-use position, and an absorption filter retaining frame, wherein said dust filter frame and retaining frame have respective clamping slopes which create an encircling, dovetailed clamping groove for holding an absorption filter in position adjacent a dust filter held by the dust filter frame when in an in-use position.

\* \* \* \* \*